(12) United States Patent
Shimoshimano et al.

(10) Patent No.: US 10,609,588 B2
(45) Date of Patent: Mar. 31, 2020

(54) CONTROL DEVICE, CONTROL METHOD, AND RECORDING MEDIUM FOR CONTROLLING CHANNELS

(71) Applicant: JVC KENWOOD Corporation, Yokohama-shi, Kanagawa (JP)

(72) Inventors: Hideo Shimoshimano, Yokohama (JP); Ichiro Shishido, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/021,208

(22) Filed: Jun. 28, 2018

(65) Prior Publication Data
US 2019/0007857 A1    Jan. 3, 2019

(30) Foreign Application Priority Data

Jun. 30, 2017    (JP) ................. 2017-129098

(51) Int. Cl.
| | | |
|---|---|---|
| H04W 72/04 | (2009.01) | |
| H04W 24/10 | (2009.01) | |
| H04W 74/00 | (2009.01) | |
| H04L 5/00 | (2006.01) | |
| H04W 36/08 | (2009.01) | |
| H04L 1/00 | (2006.01) | |
| H04W 36/32 | (2009.01) | |
| H04W 36/30 | (2009.01) | |

(52) U.S. Cl.
CPC ........... *H04W 24/10* (2013.01); *H04L 5/0037* (2013.01); *H04W 36/08* (2013.01); *H04W 72/0406* (2013.01); *H04W 74/004* (2013.01); *H04W 74/006* (2013.01); *H04L 1/0026* (2013.01); *H04W 36/30* (2013.01); *H04W 36/32* (2013.01)

(58) Field of Classification Search
CPC ............ H04W 24/10; H04W 72/0406; H04W 74/006; H04W 74/004
See application file for complete search history.

(56) References Cited

U.S. PATENT DOCUMENTS

| | | | |
|---|---|---|---|
| 2011/0002275 A1* | 1/2011 | Shousterman | ........ H04W 16/06 370/329 |
| 2011/0136499 A1* | 6/2011 | Miyata | ................ H04J 11/0036 455/452.2 |
| 2011/0269449 A1* | 11/2011 | Kazmi | ................... H04B 7/024 455/422.1 |
| 2011/0269493 A1* | 11/2011 | Zhu | ......................... H04L 5/003 455/509 |
| 2012/0236806 A1* | 9/2012 | Doppler | ............... H04W 28/16 370/329 |
| 2012/0269154 A1* | 10/2012 | Wang | ............... H04W 72/1242 370/329 |

(Continued)

FOREIGN PATENT DOCUMENTS

JP    2006-86923 A    3/2006

*Primary Examiner* — Chi Ho A Lee
(74) *Attorney, Agent, or Firm* — Brundidge & Stanger, P.C.

(57) ABSTRACT

A detector in a control device detects a quality of a signal received by a first base station device and transmitted from a terminal device using a first channel. A channel setting controller in the control device changes a reception channel of a second base station device from a second channel to the first channel when the detector detects a drop in the quality of the signal.

5 Claims, 14 Drawing Sheets

(56) References Cited

U.S. PATENT DOCUMENTS

| | | | |
|---|---|---|---|
| 2015/0189568 A1* | 7/2015 | Stanze | H04W 36/0077 370/331 |
| 2015/0256306 A1* | 9/2015 | Kim | H04B 7/024 370/329 |
| 2015/0305004 A1* | 10/2015 | Ohta | H04W 16/04 370/330 |
| 2016/0028584 A1* | 1/2016 | Lee | H04L 69/08 709/226 |
| 2016/0205675 A1* | 7/2016 | Zhang | H04W 72/044 455/450 |

* cited by examiner

FIG.2

|  | CH NUMBER | RECEPTION FREQUENCY (MHz) | TRANSMISSION FREQUENCY (MHz) |
|---|---|---|---|
| BASE STATION DEVICE | 1 | 450.00000 | 450.50000 |
|  | 2 | 451.00000 | 451.50000 |
|  | 3 | 452.00000 | 452.50000 |
| TERMINAL DEVICE | 1 | 450.50000 | 450.00000 |
|  | 2 | 451.50000 | 451.00000 |
|  | 3 | 452.50000 | 452.00000 |

FIG.6

|  | CH NUMBER | RECEPTION FREQUENCY (MHz) | TRANSMISSION FREQUENCY (MHz) |
|---|---|---|---|
| BASE STATION DEVICE | 1 | 450.00000 | 450.50000 |
|  | 2 | 451.00000 | 451.50000 |
|  | 3 | 452.00000 | 452.50000 |
|  | 11 | 451.00000 | 450.50000 |
|  | 12 | 452.00000 | 451.50000 |
|  | 13 | 450.00000 | 452.50000 |
|  | 21 | 452.00000 | 450.50000 |
|  | 22 | 450.00000 | 451.50000 |
|  | 23 | 451.00000 | 452.50000 |
| TERMINAL DEVICE | 1 | 450.50000 | 450.00000 |
|  | 2 | 451.50000 | 451.00000 |
|  | 3 | 452.50000 | 452.00000 |

FIG.7

| BASE STATION DEVICE NUMBER | CH NUMBER | BASE STATION POSITION COORDINATES (LATITUDE, LONGITUDE) | RECEPTION RADIUS (Km) | BASE STATION DEVICE IP ADDRESS |
|---|---|---|---|---|
| 001 | 1 | 35.509230, 139.555741 | 10.5 | 172.16.1.1 |
| 002 | 2 | 35.509509, 139.556785 | 11.2 | 172.16.1.2 |
| 003 | 3 | 35.508845, 139.554409 | 9.5 | 172.16.1.3 |
| 004 | 1 | 35.510077, 139.614453 | 13.5 | 172.16.1.4 |
| 005 | 2 | 35.510260, 139.616714 | 10.9 | 172.16.1.5 |
| 006 | 3 | 35.509727, 139.618913 | 11.3 | 172.16.1.6 |
| 007 | 1 | 35.510565, 139.630788 | 10.7 | 172.16.1.7 |
| 008 | 2 | 35.510050, 139.632104 | 9.6 | 172.16.1.8 |
| 009 | 3 | 35.510229, 139.631787 | 9.7 | 172.16.1.9 |
| 010 | 1 | 35.490181, 139.607468 | 10.6 | 172.16.1.10 |
| ... | ... | ... | ... | ... |

| TIME OF RECEPTION | BASE STATION DEVICE NUMBER | TERMINAL NUMBER | RSSI [dBm] |
|---|---|---|---|
| 10:15:10 | 004 | 005 | −95 |
| 10:15:20 | 004 | 005 | −102 |
| 10:15:30 | 004 | 005 | −109 |
| 10:15:40 | 004 | 005 | −110 |
| 10:15:50 | 004 | 005 | −118 |
| 10:16:10 | 004 | 005 | −120 |
| ... | ... | ... | ... |
| 12:45:30 | 002 | 006 | −85 |
| 12:45:30 | 003 | 010 | −110 |
| 12:45:31 | 005 | 009 | −90 |
| 12:45:40 | 002 | 006 | −86 |
| 12:45:40 | 003 | 010 | −105 |
| 12:45:40 | 005 | 009 | −91 |
| ... | ... | ... | ... |
| 15:55:32 | 004 | 002 | −96 |
| 15:55:40 | 004 | 002 | −95 |
| 15:58:23 | 004 | 001 | −100 |
| 15:58:30 | 004 | 001 | −102 |
| 15:58:40 | 004 | 001 | −90 |
| 16:30:10 | 004 | 010 | −97 |
| ... | ... | ... | ... |

| TERMINAL NUMBER | PRIORITY LEVEL |
|---|---|
| 001 | 10 |
| 002 | 8 |
| 003 | 2 |
| 004 | 2 |
| 005 | 3 |
| 006 | 6 |
| 007 | 7 |
| 008 | 5 |
| 009 | 1 |
| 010 | 6 |
| 011 | 4 |
| ... | ... | ized
CONTROL DEVICE, CONTROL METHOD, AND RECORDING MEDIUM FOR CONTROLLING CHANNELS

CROSS-REFERENCE TO RELATED APPLICATION

This application is based upon and claims the benefit of priority from the prior Japanese Patent Application No. 2017-129098, filed on Jun. 30, 2017, the entire contents of which are incorporated herein by reference.

BACKGROUND

1. Field

The present invention relates to communication technologies and, more particularly, to a control device, control method, and recording medium for controlling channels.

2. Description of the Related Art

In a digital wireless system comprised of two types of facilities including base stations and mobile stations, pairs of uplink and downlink radio frequencies are allocated. In a digital wireless system, communication is performed between a base station and a mobile station or performed between mobile stations via a base station, using the pairs of uplink and downlink radio frequencies. A mobile station is placed in a state capable of transmission by push-to-talk, and the information transmitted from the mobile station is delivered via the base station to a further mobile station capable of reception and located in the base station zone.

A base station may be in a state capable of transmission, but the received electric field intensity of a mobile station may not be at a level that enables demodulation so that the mobile station may not be able to receive communication from the base station. In order to transmit information to such a mobile station as well, the base station identifies a first mobile station not capable of receiving information from the base station and a second mobile station near the first mobile station. The base station directs the second mobile station to change its transmission frequency to the transmission frequency of the base station device for a predetermined period of time and transmit predetermined information to the first mobile station. The second mobile station receiving the direction transmits the information to the first mobile station (e.g., patent document 1).

[patent document 1] JP2006-86923

A scheme of directing the second mobile station to change its transmission frequency to the transmission frequency of the base station device for a predetermined period of time and transmit predetermined information to the first mobile station requires complicated processes in the second mobile station, i.e., the scheme requires complicated processes in mobile stations. Further, where mobile stations capable of performing the complicated processes and those that are not are coexistent, the mobile station that is not capable cannot be designated as the second mobile station so that it may not be able to perform the process.

SUMMARY

A control device according to an embodiment comprises: a detector that detects a quality of a signal received by a first base station device and transmitted from a terminal device using a first channel; and a channel setting controller that changes a reception channel of a second base station device from a second channel to the first channel when the detector detects a drop in the quality of the signal.

Another embodiment relates to a base station device. The device comprises: a communication unit that receives, from an external source, an instruction to change a reception channel to a first channel; and a control unit that changes, when the communication unit receives the instruction, the reception channel from a second channel to the first channel provided that a priority level of a terminal device that the base station device is receiving a signal from in the second channel meets a predetermined condition.

Another embodiment relates to a control method. The method comprises: detecting a quality of a signal received by a first base station device and transmitted from a terminal device using a first channel; and changing a reception channel of a second base station device from a second channel to the first channel when a drop in the quality of the signal is detected.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 shows an assignment of channels in the communication system of FIG. 1;

FIG. 6 shows a table for CHs stored in the storage of FIG. 5;

FIG. 7 shows a base station device detail information table stored in the storage of FIG. 5;

FIG. 8 shows a terminal reception history table stored in the storage of FIG. 5;

FIG. 13 shows a priority table stored in the storage according to embodiment 2.

DETAILED DESCRIPTION

Figure 1:
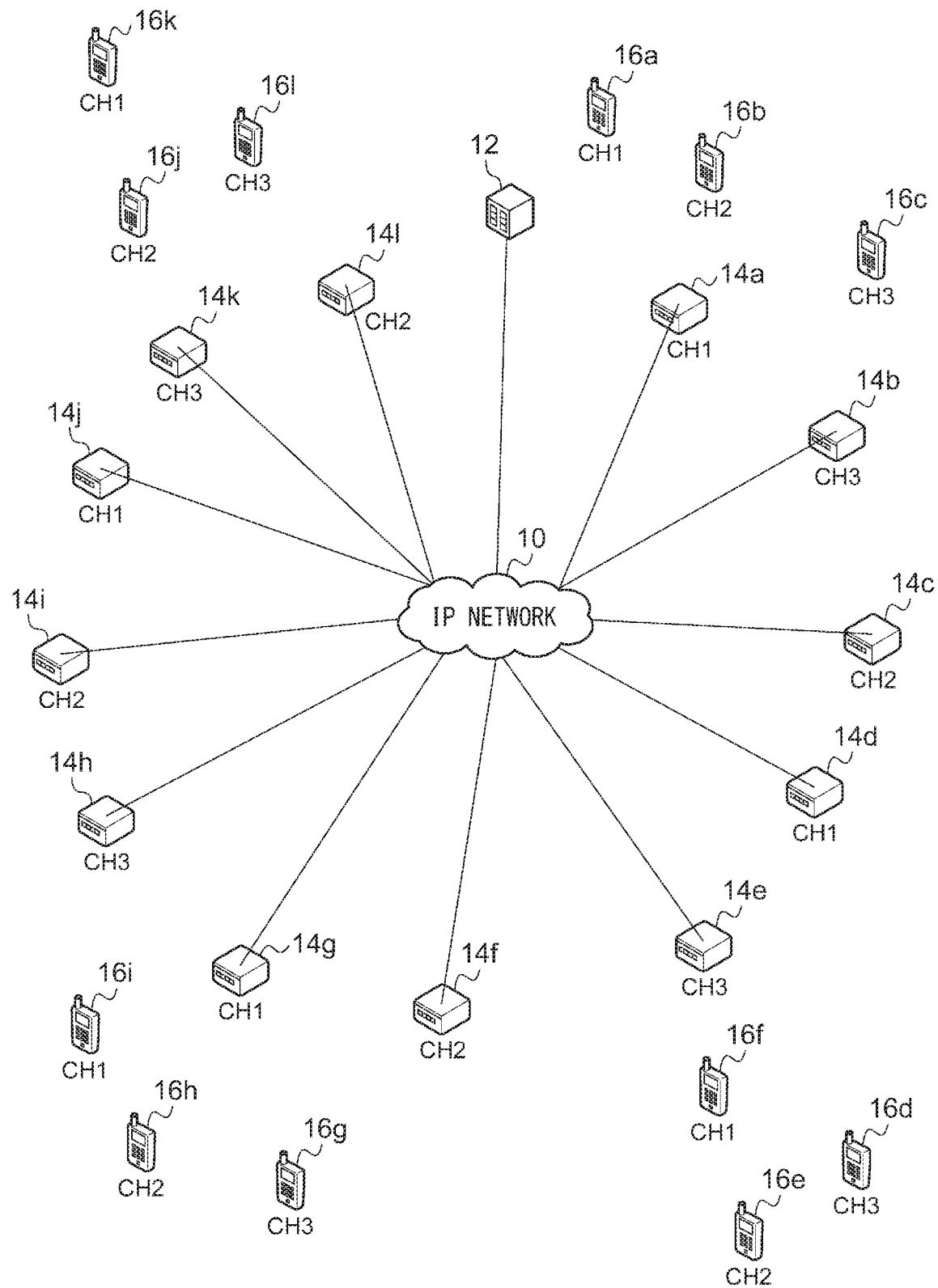
FIG. 1 shows a configuration of a communication system according to embodiment 1.

The invention will now be described by reference to the preferred embodiments. This does not intend to limit the scope of the present invention, but to exemplify the invention.

Embodiment 1

A summary will be given before describing the invention in specific details. Embodiment 1 relates to a communication system including a plurality of terminal devices configured to communicate with each other via a base station device. The communication system is compatible with, for example, a business wireless system and performs group communication. The frequency of a link from a terminal device to a base station device (hereinafter, "uplink frequency") and the frequency of a link from a base station device to a terminal device (hereinafter, "downlink frequency") are different. The uplink frequency corresponds to the reception frequency in the base station device, and the downlink frequency corresponds to the transmission frequency in the base station device. A plurality of uplink frequencies and a plurality of downlink frequencies are defined, and a combination of one uplink frequency and one downlink frequency are set in the base station device. Hereinafter, the combination may be referred to as "channel", but only one of the uplink frequency and the downlink frequency may also be referred to as "channel". "Channel" may be denoted by "CH". CHs are different from one group to another. A plurality of base station devices are connected to a control device. The control device controls the base station devices. When a base station device receives a call information (transmission information) from a terminal device, the control device transfers the received call information to a further base station device using the same CH as the receiving base station device. This represents group communication performed across a plurality of base station devices.

A usual practice in a business wireless system is to define a CH used for each group. For this reason, a CH set in a base station device cannot be changed easily to a CH used in another group. For this reason, when a terminal device transmits call information within a communication area of the base station device using the CH of the group to which the terminal device belongs and leaves the communication area while still transmitting the call information, the call information will not be received by the base station device unless the terminal device will be in a further communication area using that CH. This results in interruption of communication. It is therefore desired that the call information is not interrupted even if the communication area of the base station device in which the usable CH is set is left. In other words, it is desired that communication of call information be performed without interrupting sound even if a terminal device moves across communication areas.

When the control device according to this embodiment detects that a terminal device transmitting call information is about to leave a communication area, the control device searches for one or more further base station devices forming a communication area contiguous with that communication area. In this process, the positional information of the terminal device is not used and the position and the radius of communication area of the base station device, which is not easily moved once located, are used. If the further base station device does not receive call information from a further terminal device and is using a CH different from the CH used by the terminal device, the control device changes the uplink frequency used by the further base station device to the uplink frequency of the CH used by the terminal device. In other words, the further base station device that is not receiving currently or within a predetermined period of time is temporarily used. Meanwhile, the downlink frequency of the further base station device remains unchanged.

FIG. 1 shows a configuration of a communication system 100 according to embodiment 1. The communication system 100 includes an Internet protocol (IP) network 10, a control device 12, a first base station device 14a through a 12th base station device 14l, which are generically referred to as base station devices 14, and a first terminal device 16a through a 12th terminal device 16l, which are generically referred to as terminal devices 16. In the business wireless system, the base station device 14 is also referred to as a repeater. The number of base station devices 14 included in the communication system 100 is not limited to "12", and the number of terminal devices 16 is not limited to "12". A larger or smaller number of base station devices or terminal devices may be included. In embodiment 1, it is assumed that the terminal device 16 is not equipped with positioning functions based on a Global Positioning System (GPS), etc. Alternatively, the terminal device 16 may be equipped with positioning functions. The control device 12 is connected to each of the plurality of base station devices 14 via the IP network 10.

As described above, the plurality of terminal devices 16 and the plurality of base station devices 14 are compatible with the business wireless system. Each terminal device 16 performs speech communication via one of the base station devices 14. Each terminal device 16 is provided with a push to talk (PTT) button, and the terminal device 16 in which the PTT button is pressed transmits a speech of a user to the base station device 14 as call information. When the base station device 14 receives the call information from the terminal device 16, the base station device 14 transmits the call information to the control device 12 via the IP network 10. The control device 12 transmits the call information to the plurality of base station devices 14 via the IP network 10. The plurality of base station devices 14 transmit the call information so that the terminal devices 16 other than the terminal device 16 transmitting the call information receive the call information from the base station devices 14. In the communication system 100, a group is formed by one or more terminal devices 16 and communication is enabled within the group. For example, in group communication like this, a given one terminal device 16 transmits to a plurality of other terminal devices 16 via the base station device 14 in one-to-many mode of communication.

FIG. 2 shows an assignment of channels in the communication system 100. CH1, CH2, and CH3 are commonly defined for the base station devices 14 and the terminal devices 16. The figure illustrates an exemplary relationship between channel numbers and reception frequencies and transmission frequencies of the base station devices 14. The figure also illustrates an exemplary relationship between channel numbers and reception frequencies and transmission frequencies of the terminal devices 16. In the following description, the reception frequency of the base station device 14 will be referred to as uplink frequency, and the transmission frequency of the base station device 14 will be referred to as downlink frequency. The uplink frequency corresponds to the transmission frequency of the terminal device 16, and the downlink frequency corresponds to the reception frequency of the terminal device 16. Different uplink frequencies and downlink frequencies are defined in CH1, CH2, and CH3. It is assumed here that CH1 is defined by a combination of the first uplink frequency and the first downlink frequency, CH2 is defined by a combination of the second uplink frequency and the second downlink frequency, and CH3 is defined by a combination of the third uplink frequency and the third downlink frequency. Thus, a plurality of downlink frequencies and uplink frequencies are defined as being available for setting in the plurality of base station devices 14. Reference is made back to FIG. 1.

If the terminal device 16 configured for the uplink frequency of CH1 originates a call, only the base station device 14 configured for the uplink frequency of CH1 is capable of transmitting or receiving the call. Therefore, the other base station devices 14 and terminal devices 16 configured for CH2 and CH3 are capable of communication even while CH1 is being used for communication. The CHs used in the respective base station devices 14 and terminal devices 16 are denoted here by, for example, "CH1", "CH2", and "CH3". For clarity of description, it is assumed below that one group uses CH1, another group uses CH2, and a still another group uses CH3. In other words, it is assumed that different CHs are used for different groups.

Figure 3:
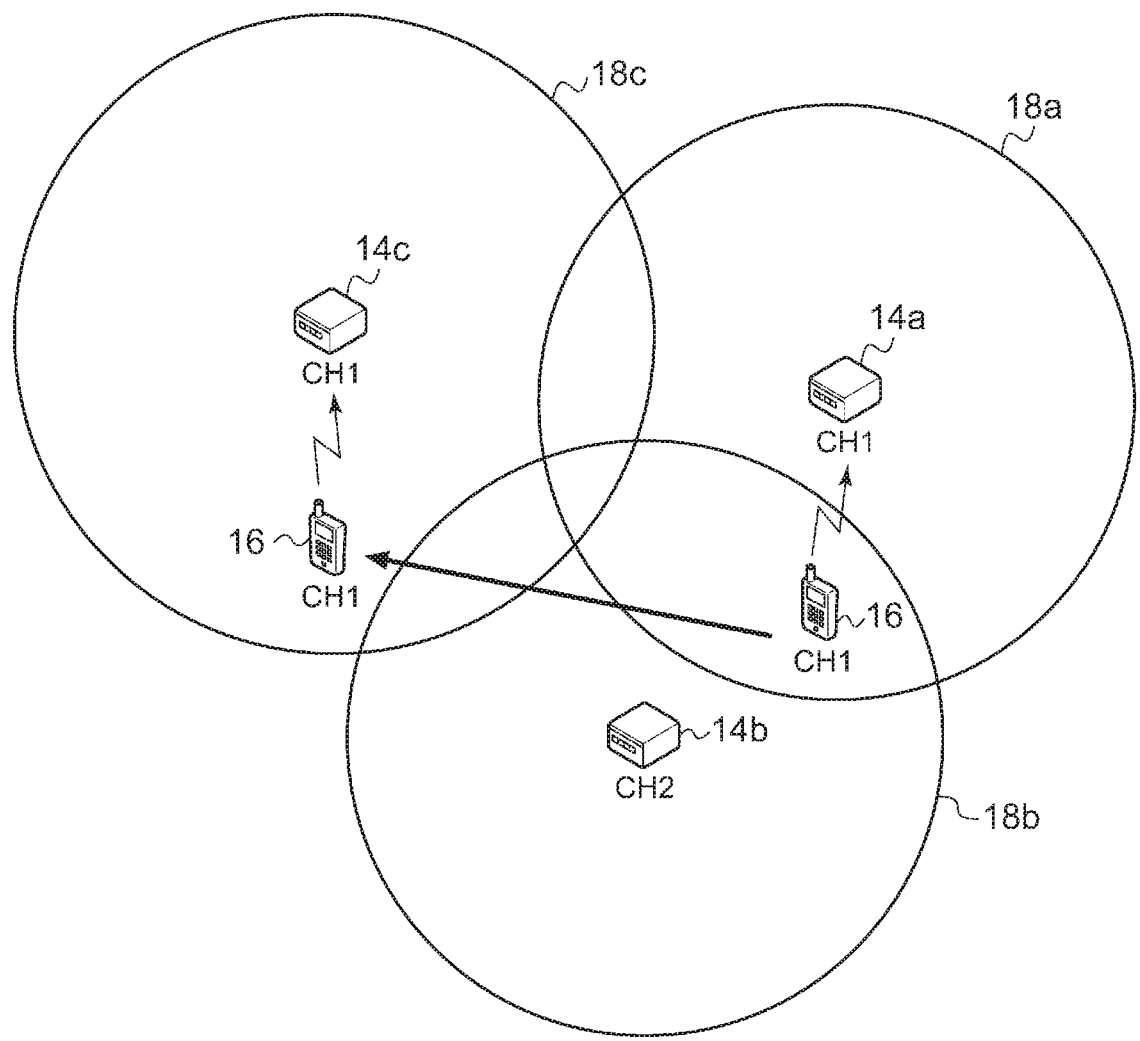
FIG. 3 shows a summary of a process using the channel assignment of FIG. 2.

FIG. 3 shows a summary of a process using the channel assignment. Each base station device 14 forms a communication area 18 as an area where communication is enabled. To describe it in further details, the first base station device 14a forms a first communication area 18a, the second base station device 14b forms a second communication area 18b, and the third base station device 14c forms a third communication area 18c. Further, the first base station device 14a and the third base station device 14c use CH1, the second base station device 14b uses CH2, and the terminal device 16 uses CH1. Therefore, the terminal device 16 is capable of communication in the first communication area 18a and the third communication area 18c but is not capable of communication in an area covered only by the second communication area 18b. If the terminal device 16 moves in this situation, no problem is presented if the movement is within the first communication area 18a and the third communication area 18c. However, the terminal device 16 may temporarily leave the first communication area 18a and the third communication area 18c due to the situation of location of the base station device 14, the movement route of the terminal device 16, or the impact from an obstacle.

The terminal device 16 temporarily leaves the first communication area 18a as it moves. Meanwhile, the second base station device 14b located relatively near the first base station device 14a is not using CH1 and so cannot receive the call information from the terminal device 16. During that time, there will be no base station devices 14 capable of receiving the call information from the terminal device 16. As a result, the control device 12 of FIG. 1 will not be able to receive the call information from the terminal device 16 and so will not be able to transmit the call information to the base station devices 14. This results in the speech being interrupted in the terminal device 16 receiving the call information. A description will be given of a configuration of the control device 12 for inhibiting the occurrence of a situation like this, but a description will first be given first of a configuration of the base station device 14.

Figure 4:
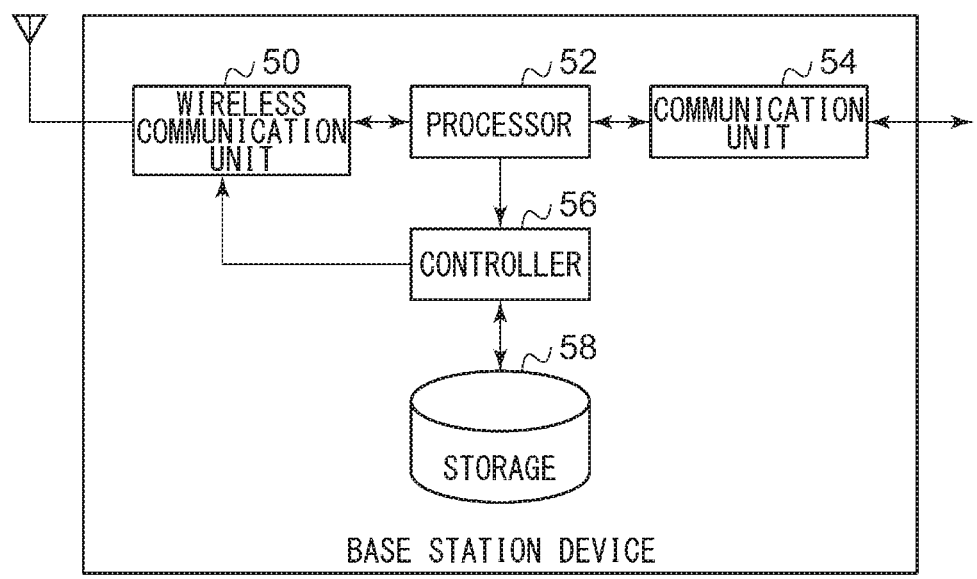
FIG. 4 shows a configuration of the base station device of FIG. 1.

FIG. 4 shows a configuration of the base station device 14. The base station device 14 includes a wireless communication unit 50, a processor 52, a communication unit 54, a controller 56, and a storage 58. The wireless communication unit 50 communicates with the terminal device 16 by performing a process compatible with the business wireless system. The wireless communication unit 50 receiving call information from one terminal device 16 outputs the call information to the processor 52. The processor 52 outputs the call information to the communication unit 54. A predetermined process responsive to the call information may be performed in the processor 52. The communication unit 54 is connected to the IP network 10 of FIG. 1 and transmits the call information to the control device 12 via the IP network 10. The communication unit 54 receiving the call information from the control device 12 via the IP network 10 outputs the call information to the processor 52. The processor 52 outputs the call information to the wireless communication unit 50. The wireless communication unit 50 transmits the call information from the processor 52 unit to the terminal device 16.

The communication unit 54 also receives information on the uplink frequency and the downlink frequency that should be used in the wireless communication unit 50 from the control device 12 via the IP network 10. This can be said to be information on the CH that should be used in the wireless communication unit 50 (hereinafter, "CH information"). The controller 56 stores the CH information from the communication unit 54 via the processor 52. The storage 58 stores correspondence between combinations of uplink and downlink frequencies and CHs as shown in FIG. 2 in a table for CHs. The controller 56 acquires the uplink frequency and the downlink frequency corresponding to the CH information, based on the table for CHs stored in the storage 58. The controller 56 sets the uplink frequency and the downlink frequency thus acquired in the wireless communication unit 50.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 5:
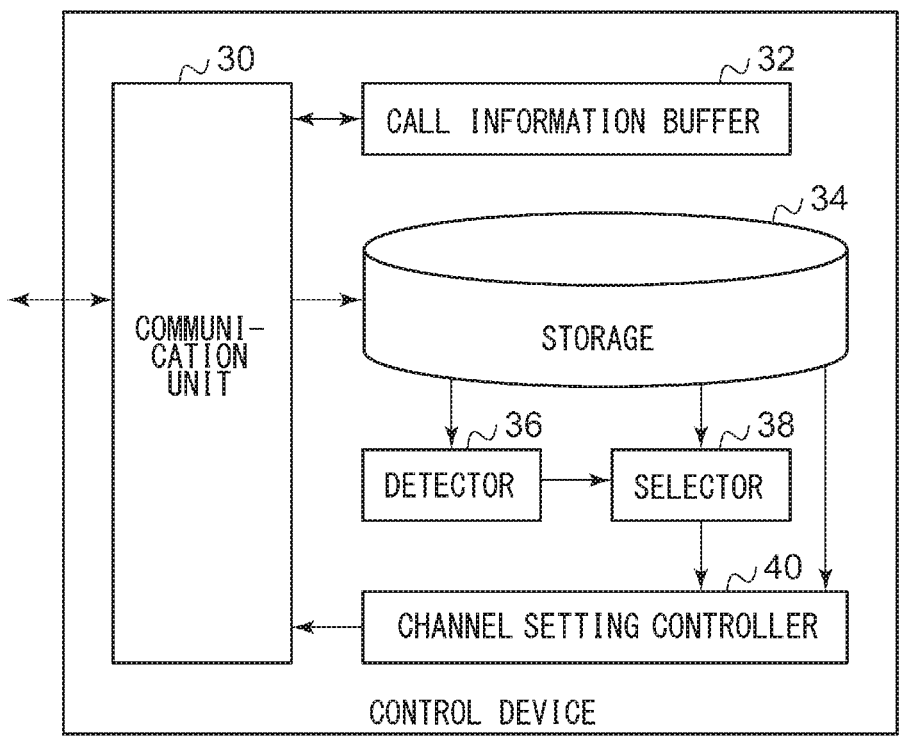
FIG. 5 shows a configuration of the control device of FIG. 1.

FIG. 5 shows a configuration of the control device 12. The control device 12 includes a communication unit 30, a call information buffer 32, a storage 34, a detector 36, a selector 38, and a channel setting controller 40. The communication unit 30 performs communication with a plurality of base station devices 14 via the IP network 10 of FIG. 1. One of the terminal devices 16 in the group transmits call information in CH1. One or more base station devices 14 configured for CH1 receive the call information. Each base station device 14 transmits the call information to the control device 12 along with the RSSI (Received Signal Strength Indicator) identified when the call information is received. The communication unit 30 receives the call information and the RSSI from the base station device 14. The communication unit 30 selects the base station device 14 having the maximum RSSI and transmits the call information received from the selected base station device 14 to the plurality of base station devices 14 configured for CH1. In this process, the call information buffer 32 stores the call information.

The communication unit 30 not only transmits the call information to the base station device 14 but also transmits the CH information received from the channel setting controller 40 to the base station device 14. The CH information is generated in the channel setting controller 40. For example, the channel setting controller 40 sets CH1, which is a combination of the first downlink frequency and the first uplink frequency, in a predetermined base station device 14. Further, the channel setting controller 40 sets CH2, which is a combination of the second downlink frequency and the second uplink frequency, in a further base station device 14, and sets CH3, which is a combination of the third downlink frequency and the third uplink frequency, in a still further base station device 14. In this process, the channel setting controller 40 refers to the table for CHs stored in the storage 34.

The storage 34 stores various information. FIG. 6 shows a table for CHs stored in the storage 34. CH1, CH2, and CH3 corresponding to the base station devices 14 and the terminal devices 16 are the same as the channels shown in FIG. 2. Further, it is assumed that CH11 is defined by a combination of the second uplink frequency and the first downlink frequency, CH12 is defined by a combination of the third uplink frequency and the second downlink frequency, and CH13 is defined by a combination of the first uplink frequency and the third downlink frequency. It is further assumed that CH21 is defined by a combination of the third uplink frequency and the first downlink frequency, CH22 is defined by a combination of the first uplink frequency and the second downlink frequency, and CH23 is defined by a combination of the second uplink frequency and the third downlink frequency. Setting of CH11 through CH13 and CH21 through CH23 will be described later. The table for CHs is also stored in the storage 58 of the base station device 14.

FIG. 7 shows a base station device detail information table stored in the storage 34. The base station device detail information table shows the CH numbers set in the respective base station devices 14, the position coordinates (latitude, longitude) where the respective base station devices 14 are located, the reception radius, and the IP addresses of the respective base station devices 14. The base station device detail information table is stored in the storage 34 in advance. FIG. 8 shows a terminal reception history table stored in the storage 34. The terminal reception history table shows the time when the base station device 14 transmitted the signal (e.g., call information) received from the terminal device 16 to the control device 12, the number identifying the base station device 14 that received the signal from the terminal device 16, and the number identifying the terminal device 16 that transmitted the signal, and the RSSI of the signal in the base station device 14. The terminal reception history table is written by the communication unit 30. As shown in the figure, terminal numbers (terminal identifiers) capable of uniquely identifying the terminal devices 16 are assigned to the respective terminal devices 16. The control device 12 and the base station device 14 can determine which terminal device 16 is originating a call by referring to the terminal number included in the call information. Reference is made back to FIG. 5.

Figure 9:
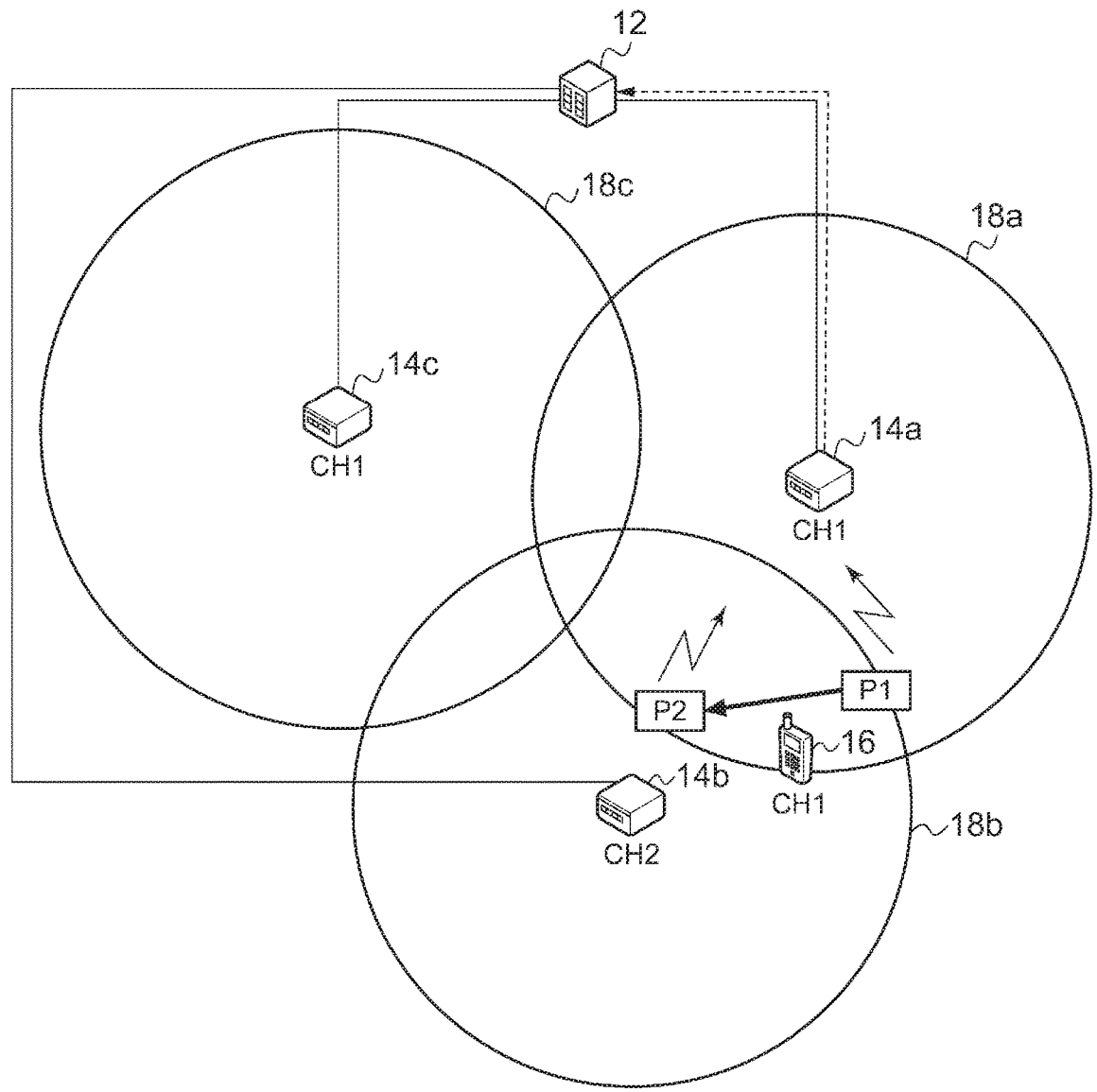
FIG. 9 shows a summary of a process performed by the control device of FIG. 5.

FIG. 9 shows a summary of a process performed by the control device 12. In the illustrated example, the terminal device 16 first transmits call information to the first base station device 14a, using CH1 at point P1. The first base station device 14a transmits the received call information to the control device 12. When the terminal device 16 moves from point P1 to point P2, the terminal device 16 approaches the border of the first communication area 18a. In this process, the detector 36 of FIG. 5 acquires, from the storage 34, the RSSI for the call information transmitted from the terminal device 16 using the first uplink frequency and received by the first base station device 14a, and detects a drop in the RSSI. In this way, the detector 36 detects that the terminal device 16 that the first base station device 14a is receiving signals from is gradually heading toward an area outside the first communication area 18a. Subsequent to this, the detector 36 detects that the RSSI drops below a threshold value, i.e., the signal quality has dropped below a threshold value. The terminal device 16 communication with which is expected to become difficult in association with the movement of the terminal device 16 may be referred to as "terminal device 16 subject to relief".

The selector 38 of FIG. 5 refers to the base station position coordinates, the reception radius, and the set CH number in the base station detail information table stored in the storage 34 and searches for the base station device 14 located near the first base station device 14a and configured for a channel other than CH1. In this process, the selector 38 refers to the terminal reception history table stored in the storage 34 and searches for the base station device 14 that has not received signals for a predetermined period of time in the past from the present. As a result of this, the base station device 14 which has not received signals in the currently set CH and in which the first uplink frequency can be set is identified.

The first base station device 14a currently connected to the terminal device 16 will be referred to as a base station device N, and the base station device 14 that is identified by the search and that is a candidate for a change in the channel setting will be referred to as a base station device M. It is also assumed that the position coordinates (latitude, longitude) and the reception radius of the base station device N are (Xn, Yn) and Rn, respectively, and the position coordinates and the reception radius of the base station device M are (Xm, Ym) are (Xm, Ym) and Rm, respectively. It is given that the unit of Rn and Rm is km. The selector 38 derives a distance d between the base station device N and the base station device M as follows.

$$d = R\cos^{-1}(\sin Y_n \sin Y_m + \cos Y_n \cos Y_m \cos(X_m - X_n)) \quad \text{(expression 1)}$$

where R denotes the radius of the earth (6378.13 km).

Alternatively, the selector 38 may derive the distance d by determining the following approximate value.

$$d = (\alpha(X_m - X_n))^2 + (\beta(Y_m - Y_n))^2 \quad \text{(expression 2)}$$

It is given here that $\alpha$ is an average distance per a latitude of 1 degree. For example, it is given that $\alpha = 111$ km. Further, $\beta$ is an average distance per a longitude of 1 degree. For example, it is given that $\beta = 91$ km. Based on the distance d between the base station device N and the base station device M, the selector 38 calculates an indicator P as follows.

$$P = \frac{Rn + Rm}{d} \quad \text{(expression 3)}$$

If P is greater than a threshold value of, for example, "1.5", the selector 38 selects the base station device 14. This is equivalent to selecting, of a plurality of base station devices M, the base station device M having a communication area 18 that is contiguous with the communication area 18 of the base station device N. The relationship between the base station device N and the base station device M like this will be referred to as being proximate. The selector 38 outputs a result of selection to the channel setting controller 40.

For example, the second base station device 14b configured for CH2 in FIG. 9 is selected. Since the second base station device 14b does not receive call information from a further terminal device 16, the CH setting in the second base station device 14b is temporarily changed from CH2 to CH22. In other words, the channel setting controller 40 of FIG. 5 changes from the second uplink frequency to the first uplink frequency in the second base station device 14b selected in the selector 38, maintaining the second downlink frequency. If the further base station device 14 selected in the selector 38 is configured for CH3, the channel setting controller 40 changes from the third uplink frequency to the first uplink frequency in the further base station device 14, maintaining the third downlink frequency. This is equivalent to temporarily changing the CH setting in the further base station device 14 from CH3 to CH13. If a plurality of base station devices 14 like this are selected, a similar process is performed for the respective base stations. The channel setting controller 40 generates CH information reflecting the change in the uplink frequency. For example, when the channel setting controller 40 changes from the second uplink frequency to the first uplink frequency in the second base station device 14b, maintaining the second downlink frequency, the channel setting controller 40 generates CH information indicating CH22. The communication unit 30 transmits the CH information to the second base station device 14b.

FIG. 4 will be used to explain the process in the base station device 14 that has received the CH information transmitted from the control device 12. It will be assumed that the base station device 14 of FIG. 4 is the second base station device 14b. A similar process may be performed in the case of other base station devices 14. The wireless communication unit 50 is capable of communicating by using CH2 with the further terminal device 16 different from the terminal device 16 using CH1. If the wireless communication unit 50 is not performing a reception process, the communication unit 54 receives the CH information from the control device 12 via the IP network 10. As mentioned above, the CH information indicates CH22. It can therefore be said that the communication unit 54 acknowledges an instruction to change from the second uplink frequency to the first uplink frequency, maintaining the second downlink frequency. The communication unit 54 outputs the CH information to the controller 56 via the processor 52.

The controller 56 refers to the table for CHs stored in the storage 58 and acquires the uplink frequency and the downlink frequency corresponding to the CH information. In this case, the first uplink frequency and the second uplink frequency are acquired. The controller 56 sets the uplink frequency and the downlink frequency thus acquired in the wireless communication unit 50. The controller 56 changes from the second uplink frequency to the first uplink frequency in the wireless communication unit 50, maintaining the second downlink frequency.

Figure 10:
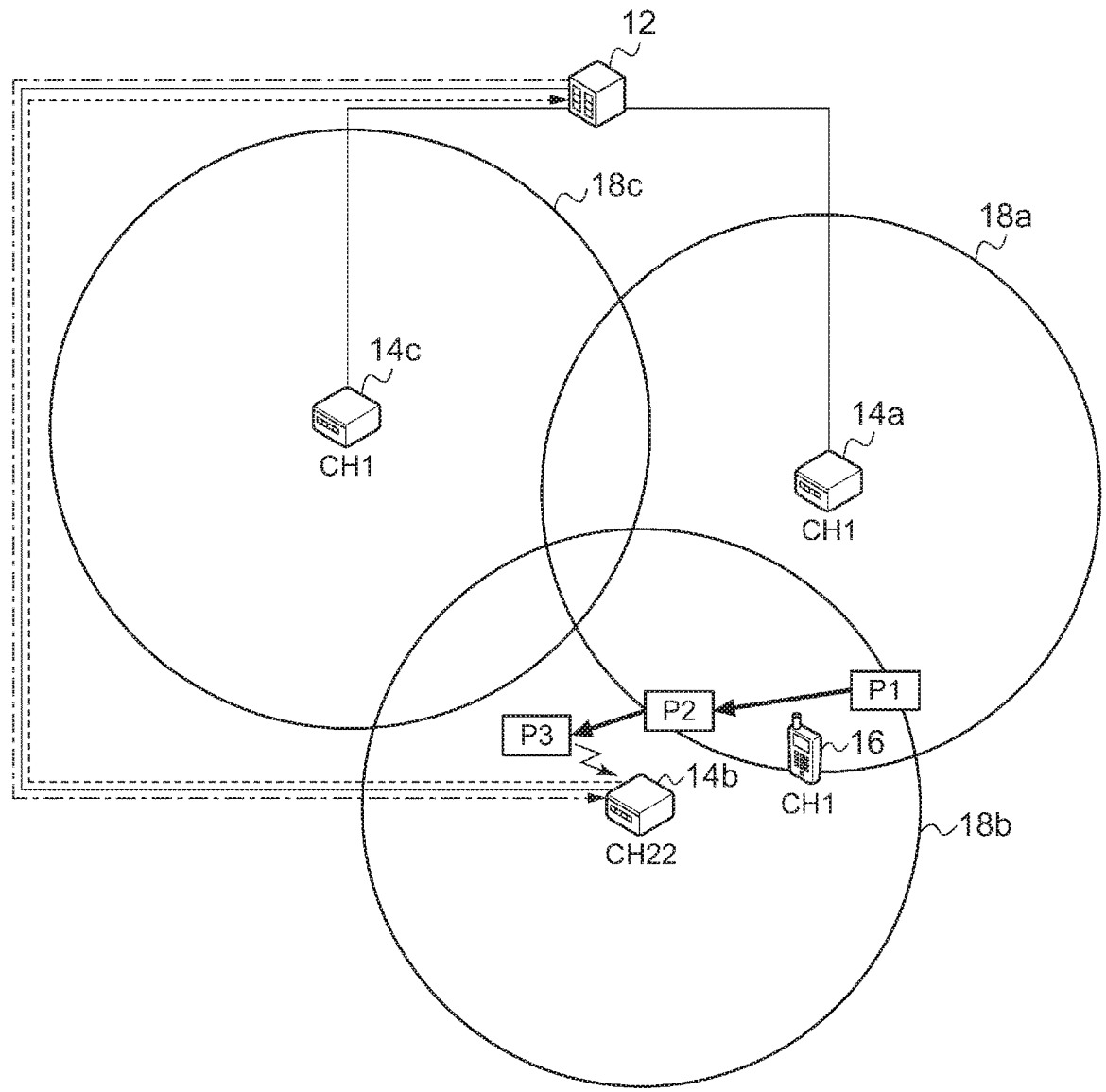
FIG. 10 shows a summary of the subsequent process in the control device of FIG. 5.

A description will be given of the process in the control device 12 performed when the process described above in the base station device 14 has been completed. FIG. 10 shows a summary of the subsequent process in the control device 12. The first uplink frequency is common to CH1 in the first base station device 14a and CH22 in the second base station device 14b. Even if the terminal device 16 (terminal device 16 subject to relief) has moved from point P2 to point P3, the call information transmitted from the terminal device 16 is received by the second base station device 14b. The second base station device 14b transmits the call information to the control device 12. Meanwhile, since the second base station device 14b uses the second downlink frequency, the further terminal device 16 having received the call information from the second base station device 14b in the second communication area 18b continues to receive the call information from the second base station device 14b by continuing to use CH2.

Figure 11:
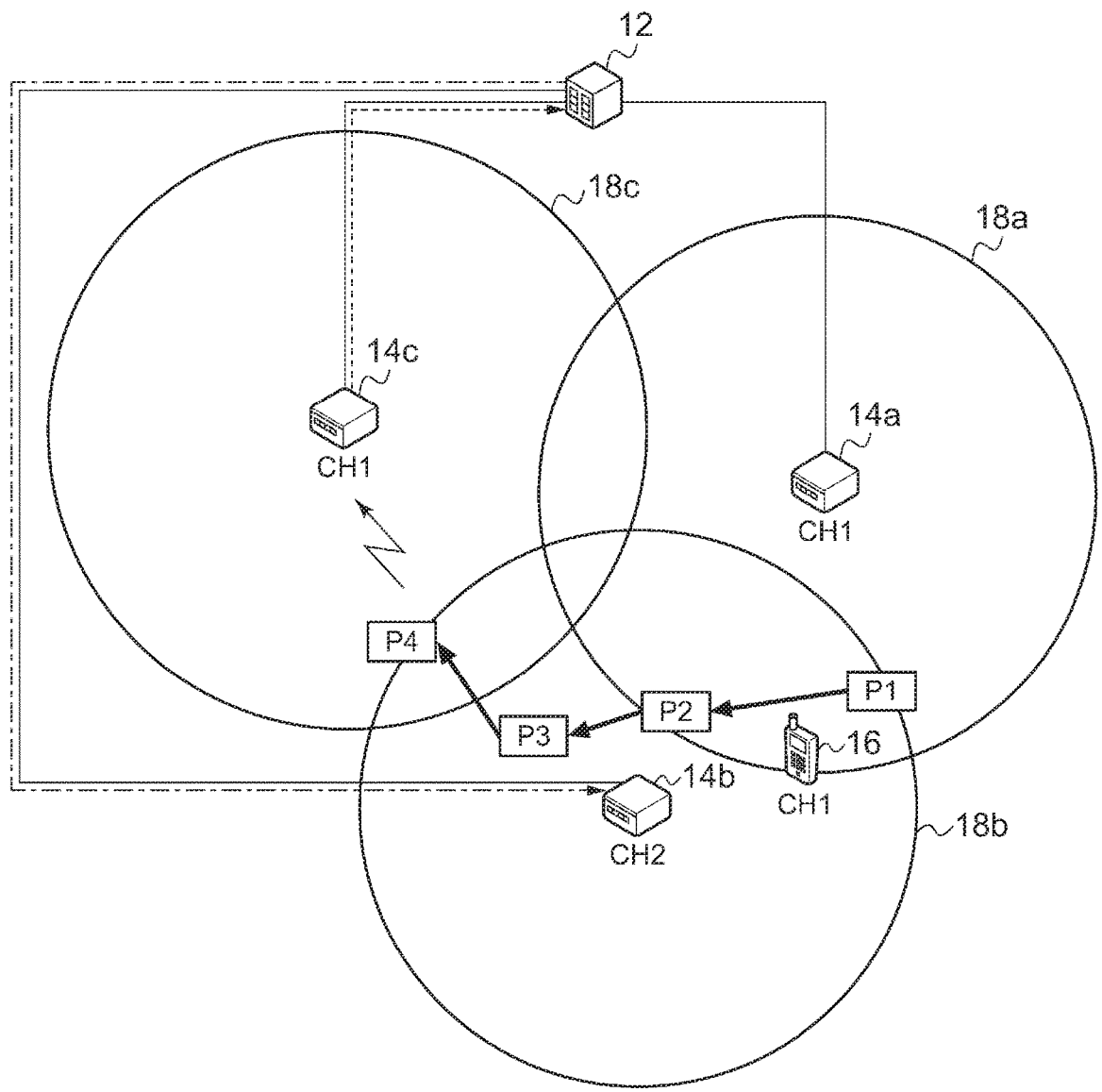
FIG. 11 shows a summary of the further subsequent process in the control device of FIG. 5.

FIG. 11 shows a summary of the further subsequent process in the control device 12. The figure shows a process performed after FIG. 10. When the terminal device 16 (terminal device 16 subject to relief) has moved from point P3 to point P4, the terminal device 16 enters the third communication area 18c. In the third communication area 18c, CH1 is used so that the terminal device 16 transmits call information to the third base station device 14c. Therefore, when the terminal device 16 enters the communication area 18 of CH1 again or when a predetermined period of time elapses after the CH information is transmitted to the second base station device 14b, the channel setting controller 40 of the control device 12 transmits CH information to the second base station device 14b to cause it to return to CH2.

Figure 12:
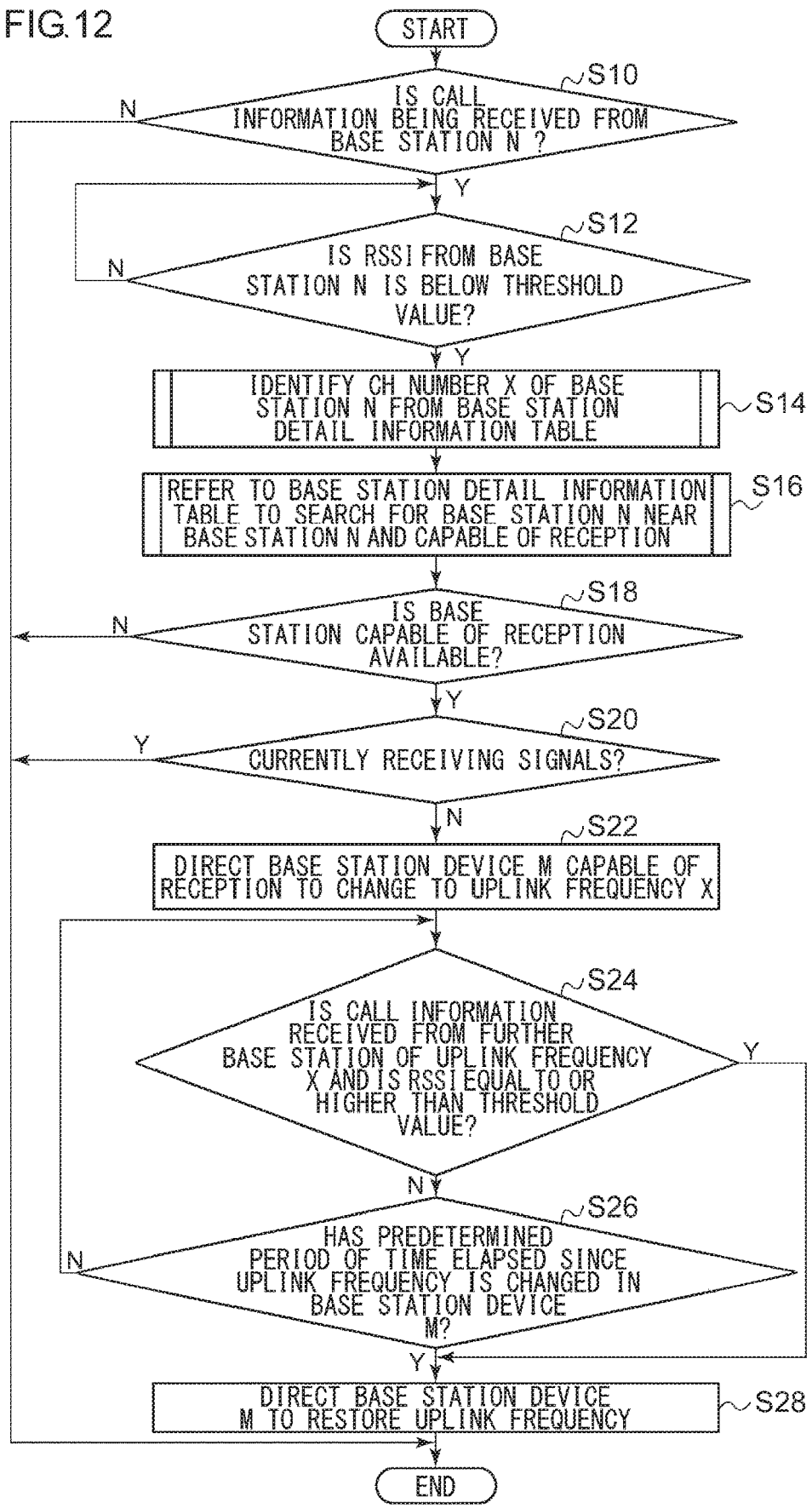
FIG. 12 is a flowchart showing a sequence of steps performed by the control device of FIG. 5.

A description will be given of the operation of the communication system 100 configured as described above. FIG. 12 is a flowchart showing a sequence of steps performed by the control device 12. In step S10, the detector 36 determines whether the communication unit 30 is receiving call information from the base station device N. If the communication unit 30 is receiving call information (Y in S10), control proceeds to step S12. In step S12, the detector 36 determines whether the RSSI from the base station device N is below a threshold value. If the RSSI is not below the threshold value (N in S12), the detector 36 waits for a predetermined period of time and returns to step S12 to repeat the step. If the detector 36 determines that the RSSI from the base station device N is below the threshold value (Y in S12), the selector 38 identifies the CH number X of the base station device N from the base station detail information table (S14). The terminal device 16 subject to relief for which an affirmative (Y) determination is made in step S12 will be denoted by a terminal device Z (terminal number Z). Subsequently, the selector 38 refers to the base station detail information table to search for a base station device 14 near the base station device N and capable of reception (S16). If a base station device 14 (base station device M) capable of reception is found (Y in S18), and the base station device M (base station device that is a candidate for setting change) is not currently receiving signals (N in S20), control proceeds to step S22. In step S22, the channel setting controller 40 refers to the table for CHs stored in the storage 34, identifies the uplink frequency X of the CH number X and directs the base station device M capable of reception to change the uplink frequency (reception frequency) to the frequency X (S22). The requirement "not currently receiving signals" in step S20 may be "not having received signals from the terminal device 16 for a predetermined period of time (e.g., 1 hour) in the past". Alternatively, a determination of "not currently receiving signals" may be made when the base station device M is not currently receiving signals and an average reception length per a unit time (e.g., 1 hour) for a predetermined period of time in the past (e.g., 6 hours) is equal to or less than a predetermined value (e.g., 3 minutes).

In step S24, the detector 36 receives the call information of the terminal device Z from the further base station device 14 in which the uplink frequency is the frequency x and determines whether the RSSI is equal to higher than a threshold value. If the condition holds (Y in S24), control proceeds to step S28. If not (N in S24), control proceeds to step S26. In step S26, the detector 36 determines whether a predetermined period of time has elapsed since the uplink frequency was changed in the base station device M. When a predetermined period of time has not elapsed (N in S26), the control is returned to step S24. When a predetermined period of time has elapsed (Y in S26), control proceeds to step S28. In step S28, the channel setting controller 40 directs the base station device M to restore the uplink frequency to the original state. When the communication unit 30 is not receiving call information from the base station device (N in S10), or when no base station devices 14 capable of reception are found (N in S18), or when the base station device that is a candidate for setting change is currently receiving signals (Y in S20), the process is terminated.

According to this embodiment, in the event that the quality of signals from the terminal device using the first uplink frequency drops below a threshold value, the second uplink frequency is changed to the first uplink frequency in the second base station device, while the second downlink frequency is maintained. Therefore, signals from the terminal device are allowed to be received by the second base station device. Since the process is performed by the control device, the likelihood that the terminal device is not capable of communication is reduced without requiring the terminal device to perform complicated processes. Since the second uplink frequency is changed to the first uplink frequency in the second base station device, while the second downlink frequency is maintained, the process in further terminal devices receiving signals from the second base station device can be continued. Since the process in further terminal devices receiving signals from the second base station device is continued, the impact on the further terminal devices is reduced.

In further accordance with this embodiment, the second base station device having a communication area contiguous with the communication area of the first base station device is selected from a plurality of second base station devices. It is therefore possible to cause call information from the terminal device to be received without interruption. In still further accordance with this embodiment, a plurality of second downlink frequencies and second uplink frequencies are defined as being available for setting in the plurality of second base station devices, the flexibility of the configuration of the communication system is improved. In still further accordance with this embodiment, the second base station device not receiving signals from further terminal devices using the second uplink frequency are subject to the process so that the impact on the further terminal devices is reduced. In still further accordance with this embodiment, the call information can be received or transmitted without interruption even if the terminal device is moving at the border of the communication area or has left the communication area temporarily. In still further accordance with this embodiment, the uplink frequency not in use can be efficiently exploited.

Embodiment 2

A description will now be given of embodiment 2. Like embodiment 1, embodiment 2 relates to a communication system including a plurality of terminal devices configured to communicate with each other via a base station device. As in embodiment 1, if a further base station device proximate to a base station device connected to a terminal device (terminal device subject to relief) is using a CH different from the CH that the terminal device uses, the uplink frequency of the further base station device is switched to the uplink frequency of the terminal device. In embodiment 1, such switching is performed when the further base station device is not receiving signals from further terminal devices. Meanwhile, switching in embodiment 2 is performed when the priority level of the terminal device subject to relief or the group including the terminal device subject to relief is higher than the priority level of further terminal device or the group including the further terminal device. The configuration of the communication system 100, the base station device 14, and the control device 12 according to embodiment 2 is of the same type as that of FIGS. 1, 4, and 5. The following description concerns a difference from the embodiment described above.

FIG. 13 shows a priority level table stored in the storage 34 according to embodiment 2. As illustrated, the priority levels of the respective terminal devices 16 are presented. For example, the smaller the value of the priority level, the higher the priority. Conversely, it may be that the larger the value of the priority level, the higher the priority. The priority level may be defined for each group including the terminal device 16 instead of for each terminal device 16.

The selector 38 of FIG. 5 refers to the base station position coordinates, the reception radius, and the set CH number in the base station detail information table stored in the storage 34 and searches for the base station device 14 located near the first base station device 14a and configured for a channel other than CH1. In this process, the selector 38 refers to the priority level table stored in the storage 34 and searches for the base station device 14 receiving signals from a further terminal device 16 having a priority level lower than the priority level of the terminal device 16 in which the signal quality dropped, in addition to the base station device 14 not currently receiving signals. As a result of this, the base station device 14 in which the reception frequency can be set to the first uplink frequency (base station device 14 that would not undergo significant trouble even if the reception frequency is changed) is identified. The subsequent steps in the channel setting controller 40 and the terminal device 16 are the same as the steps already described so that a description thereof is omitted.

The storage 34 of the control device 12 may not store the priority level table and the storage 58 of the base station device 14 may store the priority level table. In other words, the base station device 14 may perform a process based on the priority level instead of letting the control device 12 select the base station device 14 in which CH is changed based on the priority level of the terminal device 16. In this case, as previously described, the selector 38 of FIG. 5 refers to the base station position coordinates, the reception radius, and the set CH number in the base station detail information table stored in the storage 34 and searches for the base station device 14 located near the first base station device 14a and configured for a channel other than CH1. In this process, the selector 38 searches the base station devices 14 regardless of whether the base station device 14 is currently receiving signals or not. Consequently, the base station device 14, in which the reception frequency cannot be set to the first uplink frequency because the device is receiving signals in the currently set CH, is also identified by the search. The communication unit 30 transmits the CH information and the terminal number (terminal identifier) of the terminal device 16 subject to relief (relevant terminal device) to the base station device 14 identified by the search. The storage 58 of the base station device 14 stores the priority level table. When the communication unit 54 receives the CH information, the controller 56 refers to the priority level table and identifies the priority level of the terminal device 16 from which signals are currently received and the priority level corresponding to the terminal number received by the communication unit 54. When the priority level of the relevant terminal device 16 is higher than the priority level of the further terminal device 16 from which signals are currently received, the reception frequency is changed to the first uplink frequency used by the terminal device subject to relief. Meanwhile, when the priority level of the relevant terminal device 16 is lower than the priority level of the further terminal device 16, CH is not changed. Alternatively, the priority level table may be stored in both of the storage 34 of the control device 12 and the storage 58 of the base station device 14, and the communication unit 30 may transmit the priority level of the relevant terminal device instead of the terminal number of the terminal device subject to relief, to the base station device 14 identified by the search. In other words, the base station device 14 receiving an instruction to change the channel setting changes the channel setting when the priority level of the terminal device 16 from which signals are being received meets a predetermined condition. The predetermined condition requires that the priority of the terminal device 16 from which signals are being received is lower than the priority level of the further terminal device 16 relevant to the change in channel setting (terminal device 16 expected to use the post-change channel).

Figure 14:
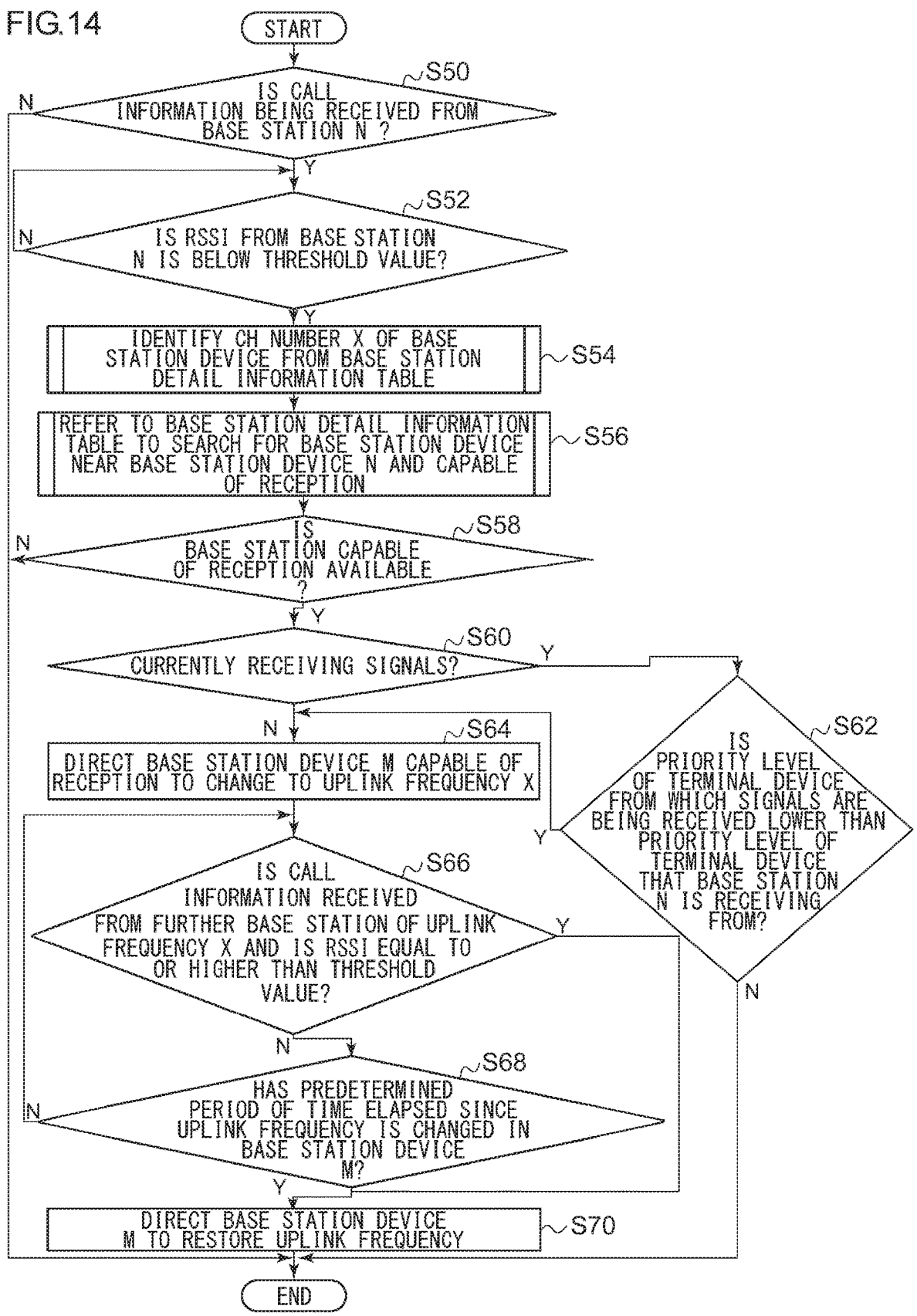
FIG. 14 is a flowchart showing a sequence of steps performed by the control device according to embodiment 2.

A description will be given of the operation of the communication system 100 configured as described above. FIG. 14 is a flowchart showing a sequence of steps performed by the control device 12 according to embodiment 2. In step S50, the detector 36 determines whether the communication unit 30 is receiving call information from the base station device N. If the communication unit 30 is receiving call information (Y in S50), control proceeds to step S52. In step S52, the detector 36 determines whether the RSSI from the base station device N is below a threshold value. If the RSSI is not below the threshold value (N in S52), the detector 36 waits for a predetermined period of time and returns to step S52 to repeat the step. If the detector 36 determines that the RSSI from the base station device N is below the threshold value (Y in S52), the selector 38 identifies the CH number X of the base station device N from the base station detail information table (S54). The terminal device 16 subject to relief for which an affirmative (Y) determination is made in step S52 will be denoted by a terminal device Z (terminal number Z). Subsequently, the selector 38 refers to the base station detail information table to search for a base station device 14 near the base station device N and capable of reception (S56). If a base station device 14 (base station device M) capable of reception is found (Y in S58), and the base station device M (base station device that is a candidate for setting change) is not currently receiving signals (N in S60), control proceeds to step S64. In step S64, the channel setting controller 40 refers to the table for CHs stored in the storage 34, identifies the uplink frequency X of the CH number X and directs the base station device M capable of reception to change the uplink frequency (reception frequency) to the frequency X (S64). If the base station device M is currently receiving signals (Y in S60), control proceeds to step S62. In step S62, a determination is made as to whether the priority level of the terminal device 16 that the base station device M is receiving signals from is lower than that of the terminal device 16 that the base station device N is receiving signals from. If the priority level is lower (Y in S62), control proceeds to step S64. The requirement "the priority level of the terminal device 16 that the base station device M is receiving signals from is lower than that of the terminal device 16 that the base station device N is receiving signals from" in step S62 may be replaced by a requirement that requires the base station device M to "combine the priority levels of the terminal devices 16 that the base station device M has received signals from for a predetermined period of time in the past (e.g., 1 hour)" and that "the combined value is lower than the priority level of the terminal device 16 that the base station device N is receiving signals from". Instead of the combined value, an average value of the priority levels may be used.

In step S66, the detector 36 receives call information of the terminal device Z from the further base station device 14 in which the uplink frequency is the frequency X, and determines whether the RSSI is equal to or higher than a threshold value. If the condition is met (Y in S66), control proceeds to step S70. If the condition is not met (N in S66), control proceeds to step S68. In step S68, the detector 36 determines whether a predetermined period of time has elapsed since the change of the uplink frequency in the base station device M. When the predetermined period of time has not elapsed (N in S68), control is returned to step S66. When the predetermined period of time has elapsed (Y in S68), control proceeds to step S70. In step S70, the channel setting controller 40 directs the base station device M to restore the uplink frequency to the original state. When the communication unit 30 is not receiving call information from the base station device (N in S50), or when no base station devices 14 capable of reception are found (N in S58), or when the priority level of the terminal device 16 that the base station M is receiving signals from is not lower than that of the terminal device 16 that the base station device N is receiving signals from (N in S62), the process is terminated.

According to this embodiment, given that the second base station device is receiving signals from a further terminal device using the second uplink frequency and that the priority level of the terminal device is higher than the priority level of the further terminal device, the second uplink frequency is changed to the first uplink frequency so that the frequency of changes can be increased. Since the frequency of changes is increased, the likelihood of continuing transmission of call information can be increased even if the terminal device leaves the current communication area. In further accordance with this embodiment, the second uplink frequency is changed to the first uplink frequency while the second downlink frequency is maintained, given that the priority level of the terminal device is higher than the priority level of the terminal device. Therefore, it is not necessary for the control device to manage the status of communication in the base station device. Since it is not necessary for the control device to manage the status of communication in the base station device, the process in the control device is simplified.

Described above is an explanation based on an exemplary embodiment. The embodiment is intended to be illustrative only and it will be understood by those skilled in the art that various modifications to constituting elements and processes could be developed and that such modifications are also within the scope of the present invention.

According to embodiments 1, 2, the business wireless system is used in the communication system 100. The type of system is non-limiting, and a wireless communication system other than the business wireless system, such as a cellular phone system, may be used. According to this variation, the flexibility of the system is improved.

According to embodiment 1, 2, the control device 12 is configured to be separate from the base station device 14 and is connected to the base station device 14 via the IP network 10. The configuration of connection is not limited to this, and the control device 12 may be connected by using a network different from an IP network. Alternatively, the control device 12 may be included in the base station device 14 or the control device 12 and the base station device 14 may be integrated. According to this variation, the flexibility of the configuration is improved.

According to embodiments 1 and 2, three uplink frequencies and three downlink frequencies are defined and the terminal device 16 uses the first uplink frequency and the first downlink frequency. Alternatively, the types of uplink frequencies and downlink frequencies is not limited to "3". The terminal device 16 may use other uplink frequencies and downlink frequencies. In that case, the processes in the control device 12 and the base station device 14 are performed similarly. According to this variation, the scope of application can be enlarged.

In embodiments 1 and 2, different frequencies for different channels are described by way of example. For example, a plurality of channels produced by time division may be prepared and the control device 12 may change the channel used by the base station device in accordance with the channel used by the terminal device subject to relief. For example, the setting of time slots in the base station device at the destination of the movement the terminal device may be changed in accordance with the time slots of the terminal device subject to relief. Alternatively, the process may be performed by using a plurality of channels produced by dividing a combination of the frequency domain and the time domain.

In embodiment 1, when the uplink channel of the base station device at the destination of the movement of the terminal device subject to relief is unused, the channel setting in that base station device is changed. This is an embodiment directed to a concept of changing, when the limited resources of a wireless communication system are not effectively used, the setting of the resources to suit the device that requires the resources.

In embodiment 2, the priority level of the terminal device subject to relief and the priority level of the terminal device using the base station device at the destination of the movement of the terminal device subject to relief are compared, and the channel of the base station device is changed in accordance with the result of comparison. This is an embodiment directed to a concept of preferentially assigning the limited resources of a wireless communication system to the device with high priority.

What is claimed is:

1. A control device comprising:
   a detector that detects a quality of a signal received by a first base station device and transmitted from a terminal device using a first channel;
   a channel setting controller that changes a reception channel of a second base station device from a second channel to the first channel when the detector detects a drop in the quality of the signal; and
   a selector that selects, from a plurality of base station devices other than the first base station device, a base station device having a communication area contiguous with a communication area of the first base station device, as the second base station device,
      wherein the channel setting controller changes the reception channel of the second base station device from the second channel to the first channel when the detector detects a drop in the quality of the signal and the second base station device is not receiving a signal in the second channel, or
      wherein the channel setting controller changes the reception channel of the second base station device from the second channel to the first channel when the detector detects a drop in the quality of the signal and the second base station device is receiving a signal from a further terminal device using the second channel, provided that a priority level of the terminal device is higher than a priority level of the further terminal device.

2. The control device according to claim 1, further comprising:
   a storage that stores a plurality of channels that can be set as a reception channel of the second base station device, wherein
   the channel setting controller selects the first channel from the channels stored in the storage.

3. The control device according to claim 1, wherein the channel setting controller does not change a transmission channel of the second base station device.

4. A control method comprising:
   detecting a quality of a signal received by a first base station device and transmitted from a terminal device using a first channel;
   changing a reception channel of a second base station device from a second channel to the first channel when a drop in the quality of the signal is detected;
   selecting, from a plurality of base station devices other than the first base station device, a base station device having a communication area contiguous with a communication area of the first base station device, as the second base station device,
      wherein the reception channel of the second base station device is changed from the second channel to the first channel when a drop in the quality of the signal is detected and the second base station device is not receiving a signal in the second channel, or
      wherein the reception channel of the second base station device is changed from the second channel to the first channel when a drop in the quality of the signal is detected and the second base station device is receiving a signal from a further terminal device using the second channel, provided that a priority level of the terminal device is higher than a priority level of the further terminal device.

5. A non-transitory computer-readable medium storing executable instructions that, in response to execution, cause a computer to perform operations comprising:
   detecting a quality of a signal received by a first base station device and transmitted from a terminal device using a first channel;
   changing a reception channel of a second base station device from a second channel to the first channel when a drop in the quality of the signal is detected;
   selecting, from a plurality of base station devices other than the first base station device, a base station device having a communication area contiguous with a communication area of the first base station device, as the second base station device,
      wherein the reception channel of the second base station device is changed from the second channel to the first channel when a drop in the quality of the signal is detected and the second base station device is not receiving a signal in the second channel, or
      wherein the reception channel of the second base station device is changed from the second channel to the first channel when a drop in the quality of the signal is detected and the second base station device is receiving a signal from a further terminal device using the second channel, provided that a priority level of the terminal device is higher than a priority level of the further terminal device.

* * * * *